United States Patent [19]

McGarvey

[11] Patent Number: 5,251,941
[45] Date of Patent: Oct. 12, 1993

[54] FAIL SAFE FITTING WITH FIRST AND SECOND FLANGE PROJECTIONS

[75] Inventor: Raymond McGarvey, Bethesda, Md.

[73] Assignee: General Components, Inc., Rockville, Md.

[21] Appl. No.: 775,041

[22] Filed: Oct. 11, 1991

[51] Int. Cl.$^5$ ............................................. F16L 23/032
[52] U.S. Cl. ................................. 285/328; 277/167.5; 277/236; 285/917; 285/354; 285/336
[58] Field of Search ...................... 277/1, 167.5, 236; 285/910, 917, 336, 328, 329, 368, 354

[56] References Cited

U.S. PATENT DOCUMENTS

| | | | |
|---|---|---|---|
| 660,862 | 10/1900 | Lovekin | 285/328 |
| 1,906,826 | 5/1933 | Smith et al. | 285/328 |
| 2,050,137 | 8/1936 | Walsh | 285/328 |
| 3,208,758 | 9/1965 | Carlson et al. | 285/336 |
| 3,239,245 | 3/1966 | Press et al. | 285/336 |
| 3,747,963 | 7/1973 | Shivak | 285/336 |
| 3,765,707 | 10/1973 | Westberg | 285/336 |
| 3,794,361 | 2/1974 | Westberg | 285/336 |
| 4,854,597 | 8/1989 | Leigh | 285/917 |
| 5,040,714 | 8/1991 | McManigal | 285/917 |
| 5,135,269 | 8/1992 | Babuder | 285/328 |
| 5,145,219 | 9/1992 | Babuder | 285/910 |

FOREIGN PATENT DOCUMENTS

| | | | |
|---|---|---|---|
| 1228871 | 11/1966 | Fed. Rep. of Germany | 277/167.5 |
| 697347 | 1/1931 | France | 285/328 |
| 836443 | 6/1981 | U.S.S.R. | 285/336 |
| 773541 | 4/1957 | United Kingdom | 285/336 |
| 8903495 | 4/1989 | World Int. Prop. O. | 277/236 |

*Primary Examiner*—Eric K. Nicholson
*Attorney, Agent, or Firm*—Lane, Aitken & McCann

[57] ABSTRACT

The present invention relates to face seal fittings for conduits or glands which employ metal gaskets. The fitting of the invention uses two annular end formations on each conduit endwall which sequentially engage the gasket to form two independent seals. The fitting is intended to be used in applications which have special cleanliness requirements.

18 Claims, 3 Drawing Sheets

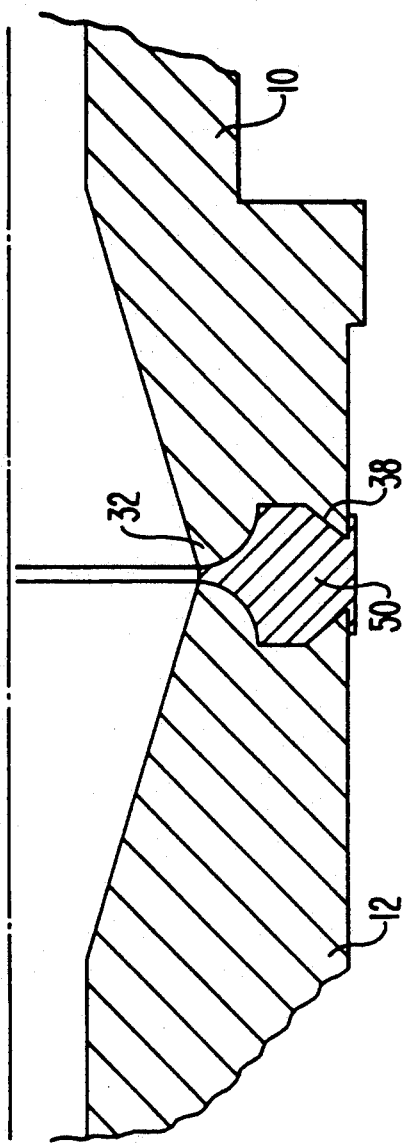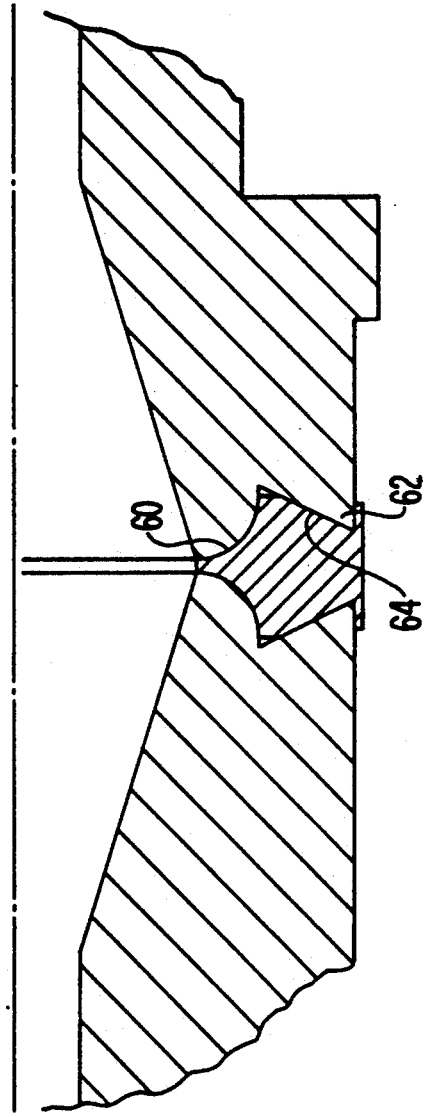

FAIL SAFE FITTING WITH FIRST AND SECOND FLANGE PROJECTIONS

BACKGROUND OF THE INVENTION

This invention relates to fittings for conduits and especially for conduits used in ultra clean rooms. The advent of new technologies such as those associated with the semi-conductor industry imposed new demands on the systems which deliver or transfer materials employed in the manufacturing processes. For example, gasses and liquids used in the semi-conductor manufacturing industry must be substantially free from all particulate matter. It has been determined that one source of undesirable particulate matter is from fittings between conduits which transfer these gases and liquids. Past fitting designs were characterized by crevices which tended to retain particulate matter and later abruptly release particulate matter at unsatisfactory levels. For applications which subject fittings to vibrations, temperature fluctuations or other physical stresses, commercially available fittings often fail and their air tight seals are lost. It also has been difficult to determine when a proper seal is achieved by the components of these fittings, and testing for seal integrity has been done by trial and error. If severe pressure or unnecessary torque is imposed on the components of these fittings, the seal components become damaged and particulate matter can be introduced into the system through them. Accordingly, it is desirable to design a reliable fitting that is easy to employ which does not significantly contribute to the introduction of particulate matter into ultraclean.

A number of specialized fittings have been developed for use in conduit systems for ultraclean environments. One successful design involves the incorporation of an integral annular sealing bead on the radial end wall of a stainless steel tubular conduit member which engages a metal gasket. The metal gasket has an annular recess designed to receive the sealing bead. This initial design has been the subject of a number of improvements such as those disclosed in U.S. Pat. No. 4,854,597 to Leigh, and U.S. patent applications Ser. No. 07/652,225 of Raymond McGarvey for "Zero Dead Volume Fitting" and Ser. No. 07/694,066 of Raymond McGarvey for "Over-tightening Prevention Gasket". Improvements have included changes to the profile of the annular sealing bead, changes to faces of the gasket which receive the bead, and devices for over-tightening prevention and torque reduction.

A second successful fitting design, known as a knife-edge seal, is often used in special applications such as when forming vacuum joints. These fittings form a seal by the penetration of a sharp edge or corner which axially projects from the conduit member into a soft metal gasket. As the knife edge penetrates the gasket, the gasket deforms and a seal is formed. These seals have been successful in high temperature environments and, in fact, in many instances the seal is baked. These high temperature environments rule out the use of non-metallic sealing elements which, when subjected to high temperatures, can fail and release materials in the form of gasses that can contaminate an ultraclean system.

Although seals formed with annular sealing beads and seals having knife-edge elements have been used, both are subject to various limitations. Because the knife-edge permanently deforms the gasket, knife edge seals are not favored for applictions which require repeated sealing engagements. Therefore, seals usually have had annular sealing beads for these applications. However, seals formed with annular sealing beads are prone to failure, especially after repeated seals or when subjected to extreme conditions. Furthermore, leaks sometimes occur after installation because of wear, mishandling, and contact with electropolishing solution. Most of these fittings are welded into systems or integrally machined on the components and, thus, are difficult and expensive to replace.

Accordingly, any improvement in seal design which maintains the integrity of the seal and minimizes the incidence of particulate matter is a welcome advancement in the industry.

SUMMARY OF THE INVENTION

The present invention is a fitting for conduits or glands that employs both an annular sealing bead and an annular a knife-edge which both form a seal with a metal gasket. The combination of these two types of seals results in a fitting with characteristics superior to those which have been achieved in the past.

The annular knife-edge and annular bead both project axially from an end wall of a tubular member intended to be connected to a second similar tubular member. The knife-edge is located around the outer circumference of a conduit having a conventional annular sealing bead or one of the variations of an annular sealing bead as disclosed herein. One face defining the knife-edge is inclined radially inwardly to a planar flat end wall which surrounds the outer profile of the annular sealing bead. An outer face of the knife-edge projection extends to the outer surface of the wall of the tubular member. The outer face of the knife-edge is parallel or nearly parallel with outer surface of the conduit while the inner face is inclined at a considerable angle with respect to the outer surface. When this knife edge engages the metal gasket which is interposed between the ends of the tubular members to be coupled, the metal of the gasket is deformed towards the central axis on which the tubular members are positioned.

The sealing bead and knife edge both engage the gasket, which preferably is made of a soft metal or a composite of both hard and soft metal. The gasket is annular and is defined by three distinct regions, an inner region having sidewalls perpendicular to the central axis, a middle region where the width of the gasket increases forming a conical section, and an outer region having sidewalls perpendicular to the axis. In a cross section of the gasket, the conical section appears as a beveled face directed towards the axis.

The axial dimension of the extension of the knife-edge from the planar surface of the end wall is also of considerable importance for the fitting to perform in its intended manner. The magnitude of this extension must be less than the maximum distance that the annular bead extends from the end wall. This relationship ensures that, as the conduit is drawn toward the gasket, the first contact is between the beveled face of the gasket and the annular sealing bead. This circle of contact is also the first location which forms a seal. As the conduit continues to be drawn toward the gasket, the knife edge engages the outer region of the gasket and penetrates the planar surface. The gasket is typically made of a softer metal than that of the tubular member and the knife-edge is able to penetrate into the gasket and deform the metal of the gasket towards the central axis.

The combination of sealing bead with a knife-edge provides a back-up seal in the event that the first seal fails. The presence of the second seal also makes the initial seal better suited to withstand extreme variations in pressure, temperature and more resistant to vibration. The combination fitting of the present invention solves virtually all bead leakage problems.

BRIEF DESCRIPTION OF DRAWINGS

FIG. 5 is an enlarged cross section of the fitting, of FIG. 1 after rotation of the coupling nut ¾ turn past finger tight.

FIG. 6 is a cross section of a second embodiment of the invention.

DETAILED DESCRIPTION OF THE INVENTION

Figure 1:
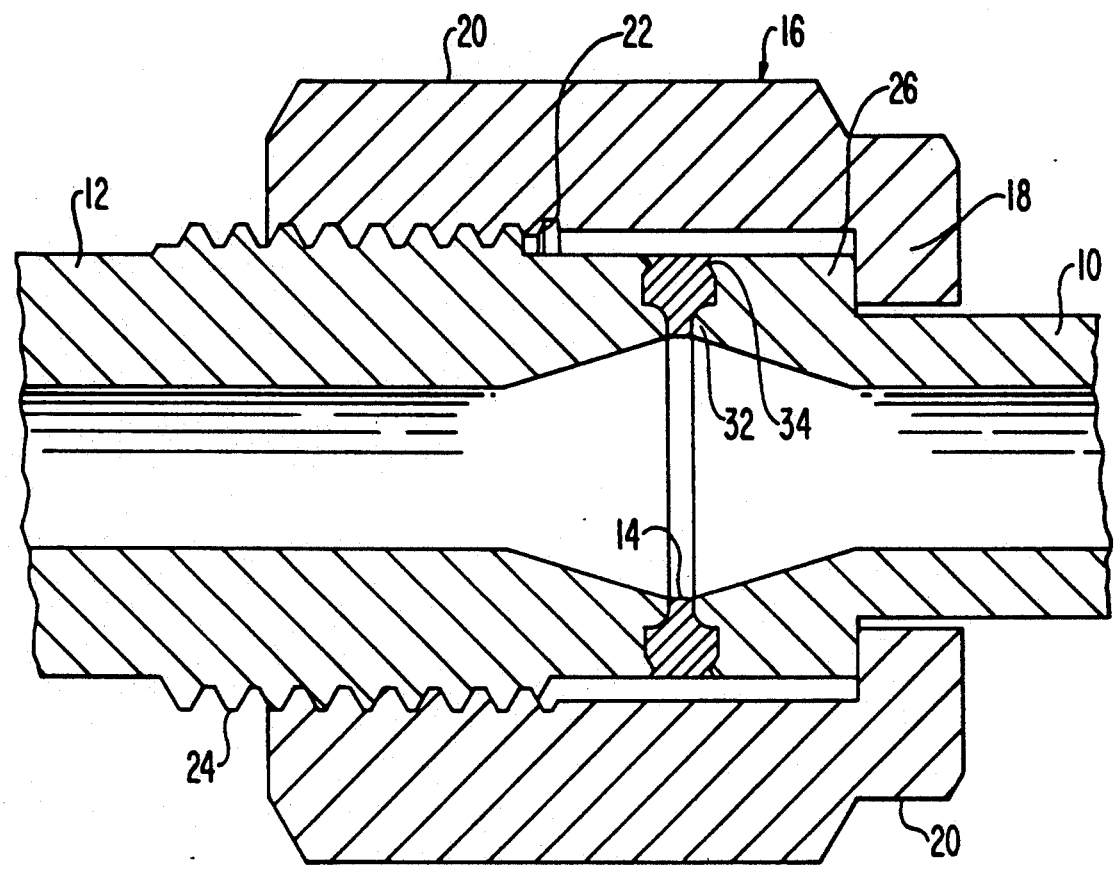
FIG. 1 is a cross section of a fitting according to a first embodiment of the invention.

Referring now to FIG. 1, a first tubular member 10 and a second tubular member 12 are shown on opposite sides of a gasket 14. Surrounding the first tubular member 10 is a coupling nut 16 which has a seat 18 and an integral hexagonal section 20 designed to be engaged by a wrench. The coupling nut 16 has threads 22 which can engage threads 24 integral with the second tubular member 12. Seat 18 engages an integral flange 26 on the first tubular member 10.

The tubular members 10 and 12 have end walls 28 and 30 respectfully, including annular sealing beads 32 which are surrounded by, spaced from, and concentric with an annular knife edge 34. The annular sealing beads and the annular knife edges project axially from the end walls 30 and 28. As can be best be seen from FIG. 3-5, the knife edge 34 has an outer face 36 which extends to an outer wall of each of tubular members 10 and 12 and an inner face 38 which extends towards the annular sealing bead 32. The inner face 38 is inclined at a 20 degree angle with respect to the end wall 28 or 30. The distance that each knife edge extends from radial end wall is 0.010 inches and is indicated by the reference letter Y in FIG. 3.

Figure 3:
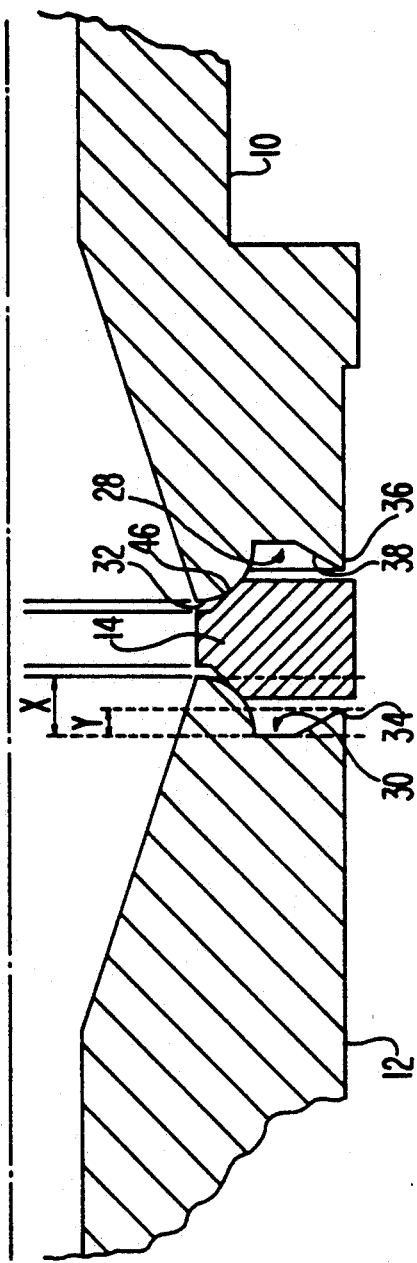
FIG. 3 is an enlarged cross section of a portion the fitting of FIG. 1 showing the gasket and the ends of the tubular members prior to the tightening of the fitting or at finger tight.

As shown in FIG. 3, the sealing bead 32 which projects 0.030 inches in the axial direction from the end wall 28 as indicated by the reference letter X. The outer portion of the sealing bead is arcuate or round. The tubular members 10 and 12, including the sealing beads 32 and the knife edges 32 are preferably made of a hard metal such as stainless steel.

The positioning of the knife-edge outside of the annular bead helps maintain the incidence of particulate matter to a minimum in the system. The manner in which the components in a knife-edge seal come together radically alters the shape of the metal gasket. This engagement is suspected to be a source of particulate matter in the form of fine metal flakes and fragments. If particulate matter is formed in the seal between the knife-edge and the gasket its introduction into the conduit system is prevented by the inner seal formed by the arcuate sealing bead. Moreover, the fact that the knife-edge does not engage the gasket until after the inner seal is formed reduces the chances of the introduction of particulate matter. FIG. 1 depicts the fitting with seals made by both the knife edge and the sealing bead.

Figure 2:
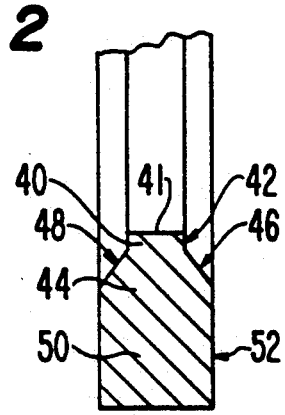
FIG. 2 is a cross section of a portion of a gasket employed in the fitting of FIG. 1.

As shown in FIG. 2, the gasket 14 is typically formed of a softer metal than that of the tubular members 10, 12 such as nickel or annealed stainless steel. The gasket 14 is circular and has three distinct regions and a central opening. A radial inner region 40 of the gasket 14 is rectilinear in cross section and has opposite faces 42 perpendicular to the central axis of the tubular members 10 and 12. The inner region 40 also has a cylindrical surface 41 defining the central opening which serves as a passage between the two tubular members 10 and 12. The central region 44 of the gasket 14 has opposite beveled faces 46 and 48 which are directed towards the central axis defined by the tubular members 10 and 12. Each beveled face 46 and 48 defines a conical surface and the central region connects the inner region 40 with an outer region 50 which also is rectilinear and has opposite faces 52 perpendicular to the central axis. A radial outer portion of the sealing bead 32 engages the beveled face 46 to form a seal and a radially inner position of the sealing bead 32 engages the face 42 of the inner region 40 of gasket 14 to form a seal.

In operation, as the coupling nut 16 is turned, threads 22 engage threads 24 on the second member which causes seat 18 to engage integral flange 26 of the first tubular member 10 and bring the tubular members together to sandwich the gasket 14. When the coupling is turned to a "finger tight" condition, the sealing beads 32 are aligned by the beveled surfaces 46 and 48 of the gasket. This alignment is important to ensure that the knife edge 34 is properly positioned to seal with the outer region 50 of gasket 14.

Figure 4:
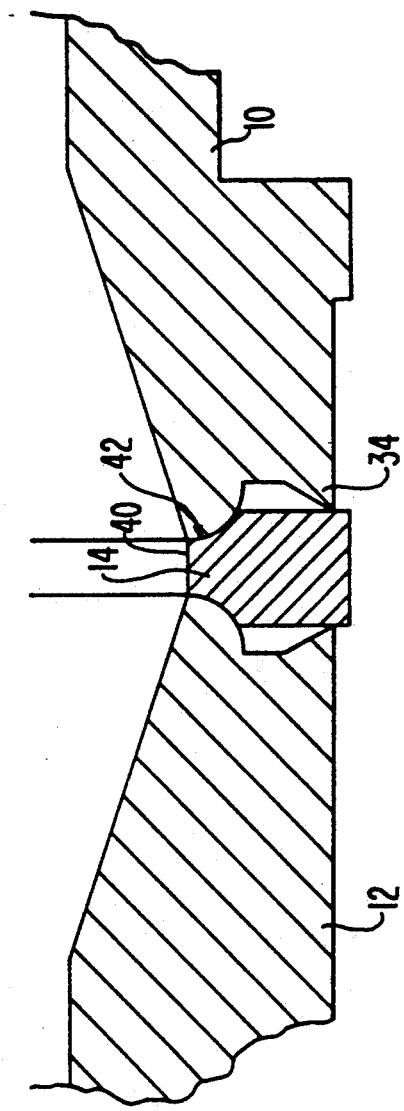
FIG. 4 is an enlarged cross section of the fitting of FIG. 1 after a coupling nut is tightened to ½ turn beyond finger tight.

As best shown in FIG. 3, rotation of the coupling nut 1/16 turn beyond the finger tight position causes rounded sealing bead 32 to contact beveled section 46 and form a seal. There is no contact between the knife edge and surface 52 of the outer region 50 of the gasket when the fitting is in the finger tight position. As shown in FIG. 4, continued rotation of the coupling nut, ½ turn beyond the point of finger tight engagement, causes the furthermost axial extension of the rounded sealing bead 32 to contact the surface 42 of inner section 40 of the gasket 14. In this position, a seal is formed by the engagement of the sealing bead with both the beveled face and the inner region of the gasket. The knife edge still does not contact the outer region of the gasket. At this position, a sufficient seal is formed for normal leak free service.

The seal formed by the beveled surface and the sealing bead takes advantage of the elastic properties of the metal. On disengagement of the surface by the sealing bead, the beveled surface can resiliently return to its original shape. Because of this property, it is possible to make repeated seals with the sealing bead.

If there is a leak due to a defect or damage to the bead components, or, if a leak forms after a seal is employed in the system, the fitting may be further tightened to effect a knife edge seal independent of the bead seal. When the coupling nut is further tightened to ½ turn past finger tight engagement, knife edge 34 begins to penetrates the outer region 50 of the gasket. As shown in FIG. 5, at ¾ turn, the knife edge completes a second seal between the inner face 38 of the knife edge 34 and the outer region 50 of the gasket. The knife edge makes a complete seal after penetration of 0.006 inches into surface 52 the gasket.

The engagement of the sealing bead on the beveled surface impose both a lateral force and a radial force on the gasket. Because the gasket is circular, the radial force is evenly distributed around the circumference and causes the metal of gasket to flow outward. Continued lateral force applied on the components tends to force the gasket outside the sidewalls of the tubular members. Extension beyond a certain point will interfere with the movement of the coupling nut. However, as the knife edge penetrates the gasket, the knife edge also retains the gasket material from extrusion beyond the radial dimensions of the tubular members. The knife-edge penetrates the surface of the gasket and arrests the outward flow of the metal while at the same time making a second seal between the gasket and the conduit end. The portion of the gasket between the sealing bead and the knife edge is in compression. Continued rotation of the coupling nut draws the end wall 28 into contact with planar surface 52 of outer region 50 of gasket 14 which arrests further lateral movement. When the fitting reaches this position there is a significant increase in resistance which indicates that the sealed condition is met.

The knife-edge deforms the gasket to a measurable degree and, in contrast to the seal formed by the sealing bead, the components do not resiliently return to the original shape when the components of the fitting are drawn apart and the seal is broken. The gasket is permanently deformed by engagement of the knife edge.

It should be understood that simultaneously with the events which occur on one side of the gasket a corresponding sequence of events occurs on the opposite side of the gasket.

FIG. 6 shows a second embodiments of the invention absent the over tightening feature as shown in FIGS. 3-5. In this embodiment the fitting is shown at ¼ turn past finger tight and the location of the sealing features on the tubular members are the same as those in the first embodiment. An annular sealing bead 60 with an arcuate profile extends from the end wall of the tubular element and, on the outside of the tubular member an annular knife-edge 62 extends from the tubular element near the periphery of the tubular member. In this embodiment, the gasket also has the same features as shown in the previous embodiment. This embodiment differs from the first embodiment in that the inner face 64 of knife-edge 62 which extends towards the annular sealing bead does not intercept an end wall which is perpendicular to a central axis formed by the tubular members. Instead the knife-edge continues to slope towards the central axis until it meets the outermost edge of the annular sealing bead 60. Thus, absent from the end wall of the tubular element, is the flat surface which engages the flat surface of the gasket. In operation, as the coupling nut is turned, the knife-edge penetrates the flat surface of the gasket and the sealing bead exerts pressure on the beveled face. As the knife-edge progresses into the flat surface of the gasket, the surface area contacted by the inner face of the knife edge continues to increase until lateral movement is gradually arrested. In contrast with the first embodiment, there is a gradual increase in resistance experienced when turning the coupling nut. As demonstrated in FIG. 6 after a seal is achieved there exists a small space defined by the inner face 64 of knife-edge 62, the gasket 14 and the outer profile of the sealing bead 60.

The above description is of a preferred embodiment of the invention and modification may be made thereto without departing from the spirit and scope of the invention which is defined in the appended claims.

I claim:

1. A face seal fitting, comprising:
   a first tubular element having a radial endwall, a first annular end projection extending from said radial endwall and a second annular end projection extending from said radial endwall positioned radially outside said first annular end projection;
   a second tubular element having a second radial endwall, a third annular end projection extending from said second radial endwall and a fourth annular end projection extending from said second radial endwall positioned radially outside said third annular end projection; and
   a gasket including
      an outer section in the form of an annulus having a first axial dimension,
      an inner section in the form of an annulus concentric with the annulus of the outer section, the inner section having a second axial dimension less than said first axial dimension; and
      a tapered section connecting said outer section with said inner section, said tapered section defining two beveled faces, directed toward the axis of said annuluses,
   wherein said first annular end projection has a first portion in axial alignment and capable of engaging one said bevel face and said second annular end projection is in axial alignment and capable of engaging said outer section of said gasket and forming a seal with said outer section.

2. The face seal fitting according to claim 1, wherein said bevel face comprises means for aligning said first and second tubular elements with one another.

3. The face seal fitting according to claim 1, wherein said fitting has a finger-type condition, in which said first portion of said first annular end projection engages said bevel surface, said second portion of said first annular end projection is spaced from said inner section of said gasket, and said second annular end projection of said first tubular element is spaced from said outer section of said gasket.

4. The face seal fitting according to claim 1, wherein said fitting has a first condition tighter than finger-tight condition, in which said first portion of said first annular end projection engages the bevel face and forms a seal, said second portion of said first annular end projection engages said inner section of said gasket, and said second annular end formation of said first tubular element is spaced from said gasket.

5. The face seal fitting according to claim 1, wherein the fitting has a second condition tighter than finger-tight condition, in which said first and second portions of said first annular end projection engages said bevel face and said inner section of said gasket, and said second annular projection of said first tubular element penetrates the outer section of said gasket.

6. The face seal fitting according to claim 1, wherein said first annular end formation has, in cross-section, a curved surface, said curved surface engaging said bevel surface of said gasket.

7. The face seal fitting according to claim 1, wherein said second annular end projection comprises a knife edge.

8. The face seal fitting according to claim 7, wherein said knife edge is defined in part by an annular surface defining, in cross-section, an oblique angle with the radial direction of the face seal fitting.

9. The face seal fitting according to claim 8, wherein said angle is approximately 20°.

10. The face seal fitting according to claim 1, wherein each of said first and second annular end projections has an area of maximum extension from said first annular end projection, said areas of maximum extension being spaced from one another.

11. A face seal fitting according to claim 1, wherein said first and second annular end projections are spaced from one another.

12. The face seal fitting according to claim 11, wherein said first tubular element defines a radial end face between said first and second annular end projections.

13. The face seal fitting according to claim 12, wherein said fitting has a condition of maximum tightness in which said first and second annular end projections form a seal with said gasket and said radial end face engages the outer section of said gasket.

14. A face seal fitting according to claim 7, wherein said knife edge comprises means for restraining the flow of gasket material radially outward.

15. A fitting comprising two tubular elements, a gasket, and means to draw said tubular elements together to engage said gasket, said tubular members further having endwalls perpendicular to an axis defined by said tubular members, each said tubular member having a first end projection comprising an annular sealing bead concentric with a second end projection comprising an annular knife edge wherein said first end projection can form a resilient seal with said gasket which does not permanently deform the gasket.

16. The fitting as recited in claim 15, wherein said annular sealing beads extend further in the axial direction than said knife-edges from said tubular members.

17. The fitting disclosed in claim 15, wherein said gasket further comprises an inner section having opposite faces perpendicular to an axis defined by said tubular members, a middle section with opposite beveled faces directed towards said axis and an outer section having opposite faces parallel with said inner opposite faces, wherein planes defined by said outer faces and second planes defined by said inner faces less than the distance said annular sealing beads extend from said end wall.

18. A method of coupling two tubular members together comprising a first step of achieving a seal between outer profiles of annular sealing beads and a gasket having beveled faces without permanently deforming the gasket, and a second step of forming a seal between a knife-edge on said tubular members and a side wall of said gasket wherein said second seal is formed outside of said first seal.

* * * * *